US012783729B1

(12) United States Patent
Schmitt et al.

(10) Patent No.: US 12,783,729 B1
(45) Date of Patent: Nov. 3, 2026

(54) SYSTEM FOR AND METHOD OF PRIVACY-PRESERVING EVENT HANDLING IN DISTRIBUTED DATA ENVIRONMENTS

(71) Applicant: Longevity Strategists, Inc., Falls Church, VA (US)

(72) Inventors: Suzanne Schmitt, Summerville, SC (US); Jennifer Late, Tysons, VA (US); Tom West, Falls Church, VA (US); Eli Wood, Boulder, CO (US); Keith Pattison, Boulder, CO (US); Bobby Nicholson, Austin, TX (US)

(73) Assignee: Longevity Strategists, Inc., Falls Church, VA (US)

( * ) Notice: Subject to any disclaimer, the term of this patent is extended or adjusted under 35 U.S.C. 154(b) by 0 days.

(21) Appl. No.: 19/422,592

(22) Filed: Dec. 17, 2025

(51) Int. Cl.
*G06F 21/62* (2013.01)
*G06F 9/451* (2018.01)

(52) U.S. Cl.
CPC .......... *G06F 21/6254* (2013.01); *G06F 9/452* (2018.02)

(58) Field of Classification Search
CPC ............................. G06F 21/6254; G06F 9/452
See application file for complete search history.

(56) References Cited

U.S. PATENT DOCUMENTS 7,292,956 B1 * 11/2007 Guday .................. G16H 15/00 702/120
8,996,350 B1 * 3/2015 Dub ...................... G06F 16/353 707/673
11,698,990 B2 7/2023 McFall et al.
2007/0033079 A1 * 2/2007 Rits ........................ G06Q 10/06 726/4
2014/0317049 A1 * 10/2014 DeRoller ............. G06Q 10/103 707/608
2017/0132200 A1 * 5/2017 Noland ................. G06F 40/186
2022/0027508 A1 * 1/2022 Rao .......................... G06N 7/01
2022/0067661 A1 * 3/2022 Bowers .................. G06Q 40/08
2023/0125696 A1 * 4/2023 Khamkar ............. G06V 30/418 705/7.14
2024/0104467 A1 * 3/2024 Guha ............... G06Q 10/06398
2025/0225460 A1 7/2025 Lekas et al.
2025/0307465 A1 * 10/2025 Fisher ................. G06F 21/6254

FOREIGN PATENT DOCUMENTS

IN 202041053688 A 6/2022
IN 202541019928 A 3/2025

* cited by examiner

*Primary Examiner* — Zhe Liu
(74) *Attorney, Agent, or Firm* — Caldwell LLC

(57) ABSTRACT

A system for privacy-preserving event handling in distributed data environments includes a memory and at least a processor communicatively connected to the memory. The memory contains instructions configuring the at least a processor to receive one or more assignment data associated with one or more external resource modules, assign the one or more assignment data to a user, generate a segmented multi-view workspace as a function of the one or more assignment data, receive an action signal associated with completion of at least one assignment of the one or more assignment data associated with the one or more external resource modules, generate a trigger event object as a function of the action signal. The processor is further configured to propagate the trigger event object to an advisor event stream within the advisor view, and transmit assignment-state data to the vendor view as a function of the trigger event object.

18 Claims, 8 Drawing Sheets

SYSTEM FOR AND METHOD OF PRIVACY-PRESERVING EVENT HANDLING IN DISTRIBUTED DATA ENVIRONMENTS

FIELD OF THE INVENTION

The present invention generally relates to the field of data management systems. In particular, the present invention is directed to a system for and a method of privacy-preserving event handling in distributed data environments.

BACKGROUND

In traditional distributed data environments, event handling processes often expose sensitive user information during task coordination between advisors, clients, and vendors. These systems fail to preserve privacy when transmitting action updates or workflow events, resulting in potential data leakage and compliance challenges.

SUMMARY OF THE DISCLOSURE

In an aspect, a system for privacy-preserving event handling in distributed data environments includes a memory and at least a processor communicatively connected to the memory, wherein the memory contains instructions configuring the at least a processor to receive one or more assignment data associated with one or more external resource modules; assign the one or more assignment data to a user; generate a segmented multi-view workspace including an advisor view, a user view, and a vendor view as a function of the one or more assignment data; receive an action signal associated with completion of at least one assignment of the one or more assignment data associated with the one or more external resource modules; generate a trigger event object as a function of the action signal, wherein generating the trigger event object as a function of the action signal includes processing, by a privacy-filtering algorithm, privacy-related information within the action signal, redacting the privacy-related information, and replacing the redacted data with anonymized tokens; propagate the trigger event object to an advisor event stream within the advisor view; and transmit assignment-state data to the vendor view as a function of the trigger event object.

In another aspect, a method of privacy-preserving event handling in distributed data environments includes receiving, by at least a processor, one or more assignment data associated with one or more external resource modules; assigning the one or more assignment data to a user; generating a segmented multi-view workspace including an advisor view, a user view, and a vendor view as a function of the one or more assignment data; receiving an action signal associated with completion of at least one assignment of the one or more assignment data associated with the one or more external resource modules; generating a trigger event object as a function of the action signal, including processing, by a privacy-filtering algorithm, privacy-related information within the action signal, redacting the privacy-related information, and replacing the redacted data with anonymized tokens; propagating the trigger event object to an advisor event stream within the advisor view; and transmitting assignment-state data to the vendor view as a function of the trigger event object.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems, apparatuses and methods for privacy-preserving event handling in distributed data environments. One system for privacy-preserving event handling in distributed data environments includes a memory and at least a processor communicatively connected to the memory, wherein the memory contains instructions configuring the at least a processor to receive one or more assignment data associated with one or more external resource modules; assign the one or more assignment data to a user; generate a segmented multi-view workspace including an advisor view, a user view, and a vendor view as a function of the one or more assignment data; receive an action signal associated with completion of at least one assignment of the one or more assignment data associated with the one or more external resource modules; generate a trigger event object as a function of the action signal, wherein generating the trigger event object as a function of the action signal includes processing, by a privacy-filtering algorithm, privacy-related information within the action signal, redacting the privacy-related information, and replacing the redacted data with anonymized tokens; propagate the trigger event object to an advisor event stream within the advisor view; and transmit assignment-state data to the vendor view as a function of the trigger event object.

Embodiments of the present disclosure relate to one or more technical challenges of managing workflow coordination and task visibility across distributed data environments while preserving user privacy. In an embodiment, disclosed systems and methods are configured to generate privacy-preserving event data by receiving one or more assignment data, processing action signals associated with user or vendor activities, and producing trigger event objects that exclude or anonymize sensitive information. In an embodiment, system thereby enables advisors to monitor workflow progress, vendor engagement, and client responses through real-time nudges and notifications without direct access to protected personal data. Advantageously, one or more such embodiments can substantially improve workflow transparency, reduce privacy risks during event propagation, and ensure compliance with data-governance standards in distributed professional ecosystems.

Figure 1:
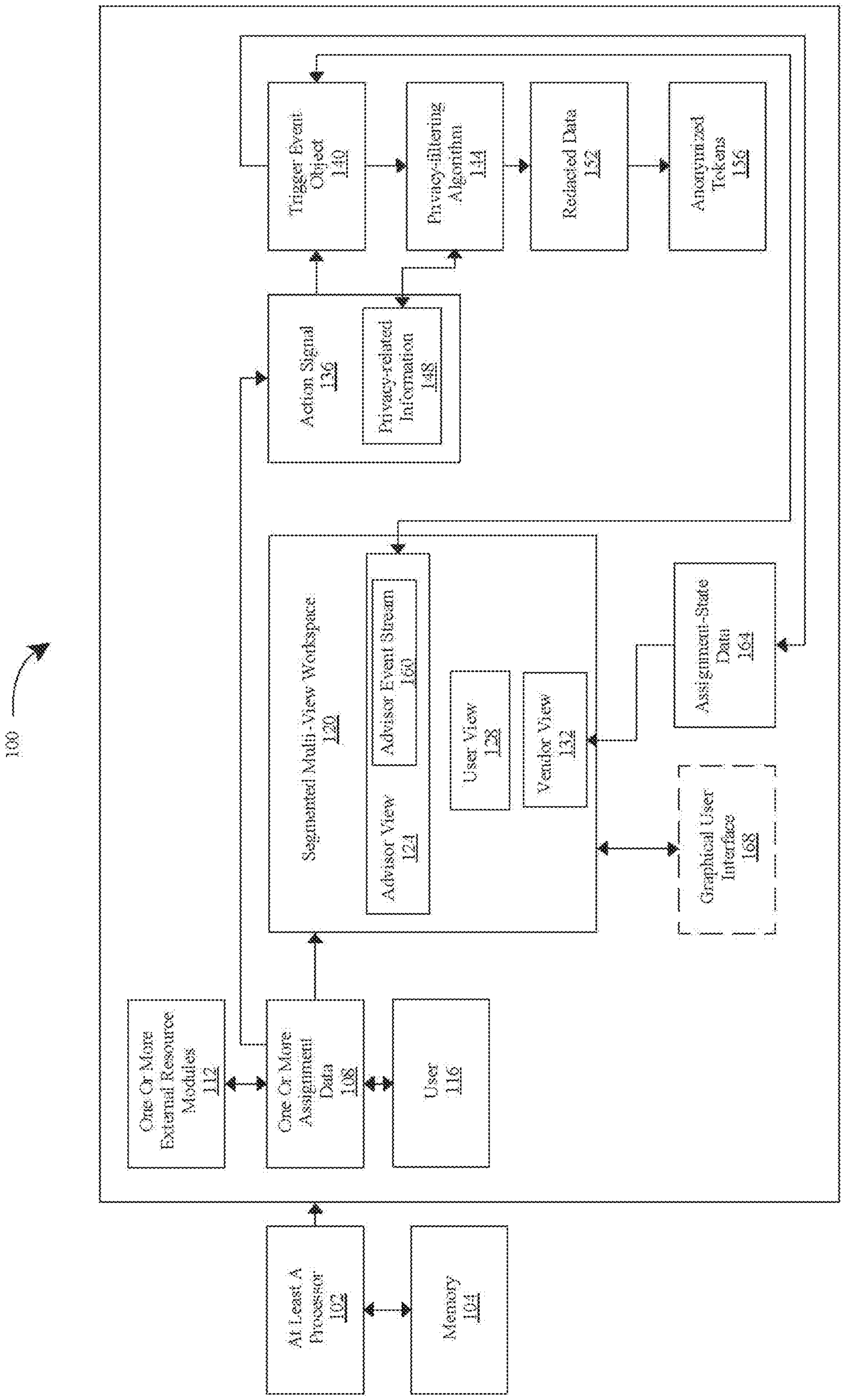
FIG. 1 is a block diagram of a system for privacy-preserving event handling in distributed data environments.

Referring now to FIG. 1, an exemplary embodiment of system 100 for privacy-preserving event handling in distributed data environments is illustrated. System 100 may include at least a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein at least a processor 102 may access the information from primary memory.

Still referring to FIG. 1, system 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, system 100 may include any "computing device" as described in this disclosure, including without limitation a microcontroller, microprocessor, digital signal processor (DSP) and/or system on a chip (SoC) as described in this disclosure. System 100 may include, be included in, and/or communicate with a mobile device such as a mobile telephone or smartphone. System 100 may include a single computing device operating independently, or may include two or more computing devices operating in concert, in parallel, sequentially or the like; two or more computing devices may be included together in a single computing device or in two or more computing devices. System 100 may interface or communicate with one or more additional devices as described below in further detail via a network interface device. Network interface device may be utilized for connecting at least a processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a processor 102 may include but is not limited to, for example, a computing device or cluster of computing devices in a first location and a second computing device or cluster of computing devices in a second location. System 100 may include one or more computing devices dedicated to data storage, security, distribution of traffic for load balancing, and the like. System 100 may distribute one or more computing tasks as described below across a plurality of computing devices of computing device, which may operate in parallel, in series, redundantly, or in any other manner used for distribution of tasks or memory between computing devices. System 100 may be implemented, as a non-limiting example, using a "shared nothing" architecture.

With continued reference to FIG. 1, at least a processor 102 may be designed and/or configured to perform any method, method step, or sequence of method steps in any embodiment described in this disclosure, in any order and with any degree of repetition. For instance, at least a processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, at least a processor 102 is configured to receive one or more assignment data 108 associated with one or more external resource modules 112. "Assignment data," as used in this disclosure, is information representing assignments or actions assigned to a designated participant within a shared workflow environment. In one or more embodiments, one or more assignment data 108 may include specific assignments, identifiers for a task, actor role, due date, completion state, and associated metadata defining task dependencies, compliance tags, and privacy visibility attributes. In one or more embodiments, one or more assignment data 108 may be received through coordinated workspaces enabling secure task delegation between professional and client interfaces. "External resource modules," as used in this disclosure, are vendor interfaces configured to enable communication, data exchange, and workflow synchronization between the platform and one or more third-party service providers. In one or more embodiments, one or more external resource modules 112 may represent a vendor node such as a caregiving agency, housing provider, tax consultant, or other service entity integrated into the advisor-client ecosystem. In one or more embodiments, one or more external resource module may include a defined application programming interface (API) endpoint, authentication credentials, and a controlled data-sharing schema that limits visibility to non-protected information while allowing task-status updates and event notifications to propagate across professional workspaces. In one or more embodiments, when at least a processor 102 receives one or more assignment data 108 linked to one or more external resource modules 112, system 100 may generate a corresponding workflow instance enabling the advisor to monitor client engagement without direct access to personally identifiable or HIPAA-sensitive data. "Privacy-preserving," as used in this disclosure, is a system property and computational approach designed to maintain confidentiality and integrity of personally identifiable information (PII) and protected health information (PHI) during data exchange, storage, and processing. Privacy-preserving operations may include, without limitation, data minimization, anonymization, pseudonymization, tokenization, differential privacy, and encryption of sensitive attributes such that individual-level identifiers cannot be reconstructed or inferred by unauthorized entities. In one or more embodiments, privacy-preserving functionality may include policy-based access control mechanisms that restrict visibility of data fields according to user roles, task context, and jurisdictional compliance requirements, such as those defined by Health Insurance Portability and Accountability Act (HIPAA). In one or more embodiments, one or more external resource modules 112 may include privacy-preserving communication pipelines defined by a controlled application programming interface (API) endpoint, authentication credentials, and a granular data-sharing schema that limits visibility to non-protected information while allowing task-status updates and event notifications to propagate across professional workspaces.

With continued reference to FIG. 1, at least a processor 102 is configured to assign one or more assignment data 108 to a user 116. "User," as used in this disclosure, is an individual or entity authorized to interact with one or more workspace interfaces within system. In one or more embodiments, user 116 may include an advisor, client, vendor representative, or other authorized participant linked to a professional ecosystem. In one or more embodiments, user 116 may have a defined access level specifying which classes of data, task attributes, and communication channels are visible or editable, thereby enforcing compliance with privacy and data-governance policies. In one or more embodiments, at least a processor 102 may assign assignment data to user 116 based on one or more role-based permissions, workflow configurations, or contextual triggers generated by external resource modules. For example and without limitation, when an advisor initiates a service referral, at least a processor 102 May automatically generate a task instance corresponding to that referral and assign it to client or vendor user for completion or acknowledgment. In one or more embodiments, one or more assignments may include one or more metadata elements specifying task visibility, due dates, linked dependencies, and compliance indicators. Once assigned, task may appear within user's workspace dashboard, enabling the user 116 to complete, forward, or comment on the task without exposing sensitive information to unrelated parties. In one or more embodiments, at least a processor 102 may track user interaction events, such as acceptance, completion, or modification of the assigned task, and generate one or more privacy-preserving feedback signals, such as nudges, directed to other authorized users within the network.

With continued reference to FIG. 1, at least a processor 102 is configured to generate segmented multi-view workspace 120 including an advisor view 124, a user view 128, and a vendor view 132 as a function of one or more assignment data 108. In one or more embodiments, segmented multi-view workspace 120 may include an access control layer, wherein access control layer may be configured to separate permissions for vendor view 132, user view 128 and advisor view 124. "Permission," as used in this disclosure, is an authorization attribute to participant, process, or data object. In one or more embodiments, permission may define specific actions that may be performed within system 100. Permissions may include, without limitation, rights to view, edit, create, share, or delete data elements within the segmented multi-view workspace. In one or more embodiments, permissions may be dynamically assigned based on participant role, task context, data sensitivity classification, and compliance requirements. "Segmented multi-view workspace," as used in this disclosure, is a digital environment partitioned into distinct interface layers or panels, each configured to display a subset of workflow data tailored to a participant's role, authorization level, and data visibility permissions. In one or more embodiments, segmented multi-view workspace 120 may include synchronized but independently filtered data views, enabling each participant, advisor, user 116, or vendor, to engage with same underlying workflow logic without accessing sensitive or irrelevant information from other participants. "Advisor view," as used in this disclosure, is a graphical and functional interface configured for professional users who oversee, assign, or monitor client and vendor related tasks. In one or more embodiments, advisor view 124 may include modules for task assignment, compliance monitoring, and "nudge" tracking, allowing advisors to visualize workflow progress, outstanding vendor actions, and client engagement levels. In one or more embodiments, advisor view 124 may include analytical dashboards summarizing task completion rates, pending nudges, and time-sensitive updates, while restricting access to client-identifiable content that resides within protected user or vendor domains. "User view," as used in this disclosure, is an interactive interface configured for a client or end-user authorized to receive, complete, or request assignments generated within system. In one or more embodiments, user view 128 may present an intuitive workspace for viewing assigned tasks, uploading confirmations, or requesting introductions to external vendors. In one or more embodiments, user view 128 may display simplified task status indicators, contextual recommendations, and notifications relevant to client actions, while concealing advisor-only notes and internal compliance metadata. "Vendor view," as used in this disclosure, is a workspace interface configured for an external resource module corresponding to a third-party service provider or vendor representative integrated into workflow. In one or more embodiments, vendor view 132 may include task information relevant to service delivery, such as referral requests, client authorization confirmations, or service progress updates, while excluding confidential financial or planning data visible only to advisors. In one or more embodiments, vendor view 132 may further include messaging modules or task status reporting interfaces allowing vendors to update task outcomes that trigger privacy-preserving nudges directed to advisor view 124. "Access control layer," as used in this disclosure, is a system-level permissions framework configured to govern and enforce data segmentation, visibility rules, and interaction privileges across segmented multi-view workspace 120. In one or more embodiments, access control layer may authenticate each participant, evaluate assigned permissions, and dynamically filter displayed data such that advisors, users, and vendors only view content relevant to their assigned roles. In one or more embodiments, access control layer may include encryption protocols, token-based authentication, and role-based access policies to ensure that client-identifiable and regulatory-protected data are never exposed outside of their intended view.

With continued reference to FIG. 1, at least a processor 102 is configured to receive an action signal 136 associated with completion of at least one assignment of the one or more assignment data 108 associated with one or more external resource modules 112. "Action signal," as used in this disclosure, is an event-triggered digital message representing a discrete change in task state, workflow status, or participant interaction within system. In one or more embodiments, action signal 136 may include metadata describing an origin of an event, type of action performed, and corresponding identifier of affected assignment data. For example and without limitation, action signals 136 may include task completion confirmations, acknowledgment of receipt, vendor status updates, document uploads, client approvals, or compliance verification responses. In one or more embodiments, action signal 136 may be generated automatically when user 116 or vendor completes a task or updates a record within their respective workspace view. For example and without limitation, when a vendor updates a referral task to indicate service completion, vendor view 132 may generate an action signal 136 that propagates through access control layer to at least a processor 102. At least a processor 102 may then validate the authenticity of action signal 136, confirm that it corresponds to a registered assignment, and update workflow records in real time. In one or more embodiments, action signal 136 may include anonymized or tokenized identifiers that allow system to confirm task completion without exposing personally identifiable information or sensitive vendor data to unauthorized users. In one or more embodiments, upon receipt of action signal 136, at least a processor 102 may trigger one or more downstream system responses, such as updating task status in segmented multi-view workspace 120, generating a privacy-preserving nudge notification for the advisor view 124, or initiating additional workflow logic associated with dependent tasks. "Assignment," as used in this disclosure, is a actionable item designated to a participant within a managed workflow framework. In one or more embodiments, an assignment may include one or more parameters defining task scope, actor role, completion criteria, dependencies, and access control level. In one or more embodiments, an assignment may be linked to specific metadata that governs when, how, and by whom associated data can be accessed or modified.

With continued reference to FIG. 1, at least a processor 102 is configured to generate a trigger event object 140 as a function of action signal 136, wherein generating trigger event object 140 as a function of action signal 136 includes processing, by a privacy-filtering algorithm 144, privacy-related information 148 within action signal 136; redacting privacy-related information 148; and replacing redacted data 152 with anonymized tokens 156. Trigger event object 140 may include metadata, wherein metadata may include an event type, timestamp, or source identifier. "Trigger event object," as used in this disclosure, is a data record created in response to an action signal 136. In one or more embodiments, trigger event object 140 may encapsulate a normalized description of event for downstream processing, notification, and auditing without exposing protected details. "Privacy-filtering algorithm," as used in this disclosure, is a set of deterministic or probabilistic rules executed by processor to detect, isolate, and transform privacy-related information 148 within an input payload. "Privacy-related information," as used in this disclosure, is any data element that can directly or indirectly identify sensitive content. In one or more embodiments, privacy-related information may be governed by contractual restrictions. "Redacted data," as used in this disclosure, is the subset of privacy-related information 148 removed or masked from action signal 136 prior to storage or transmission. "Anonymized tokens," as used in this disclosure, is replacement identifiers generated by system that map to redacted data through an access-controlled lookup such that downstream components can reference required context without revealing underlying protected values. "Metadata," as used in this disclosure, is ancillary descriptive information associated with the trigger event object 140. In one or more embodiments, metadata may include an event type, a timestamp, a source identifier, a view context, and a processing status. In one or more embodiments, at least a processor 102 may include a parsing stage that inspects action signal 136 for predefined fields and free-text segments, a classification stage that labels detected elements as privacy-related information 148 or non-sensitive information, and a transformation stage that generates anonymized tokens 156 for each redacted data 152. In one or more embodiments, privacy-filtering algorithm 144 may include pattern libraries, entity recognizers, and policy rules that may include vendor-specific constraints so that fields such as names, addresses, medical terms, invoice identifiers, or message bodies are reliably identified and removed from the payload before persistence. In one or more embodiments, trigger event object 140 may include metadata that links the event to a role-scoped context (advisor view 124, user view 128, vendor view 132), a workflow identifier derived from assignment data, and a cryptographic checksum that enables tamper detection. In one or more embodiments, system 100 may include an access-controlled token vault that stores reversible mappings between anonymized tokens 156 and original values, where only components authorized by access control layer may include permissions to resolve a token when legally permissible. In one or more embodiments, downstream services may include the trigger event object 140 to update dashboards, generate privacy-preserving nudges, or evaluate workflow rules, while the redaction and tokenization stages ensure that the same object may include sufficient operational context without disclosing privacy-related information 148.

With continued reference to FIG. 1, at least a processor 102 may be configured to generate, an adaptive query interface, wherein adaptive query interface may be configured to collect contextual attribute data from a user and receive attribute response data including one or more state variables based on collected data. At least a processor 102 may be further configured to compute context-evaluation score as a function of changes detected in state variables and generate trigger event object 140 as a function of context-evaluation score. In one or more embodiments, generating a trigger event object 140 as a function of action signal 136 may further include classifying, by a machine learning module, action signal 136 into a plurality of predefined event categories and assigning a priority value to trigger event object 140 as a function of plurality of predefined event categories. At least a processor 102 may be configured to compare priority value to at least one propagation threshold, and propagate trigger event object 140 to an advisor event stream 160 within advisor view 124 as a function of priority value and propagation threshold. "Adaptive query interface," as used in this disclosure, is a dynamic and interactive system interface configured to generate, modify, and present query prompts to a participant based on changes. In one or more embodiments, adaptive query interface may include natural-language or form-based elements that adjust in real time as at least a processor 102 evaluates user interactions. For example and without limitation, when a user 116 updates their employment or residence data, adaptive query interface may generate new questions or input fields to capture relevant contextual attributes such as income stability, housing status, or care support needs. "Contextual attribute data," as used in this disclosure, is structured or unstructured information that characterizes user's conditions relevant to task progression or event evaluation. In one or more embodiments, contextual attribute data may include temporal factors (e.g., date of last engagement), behavioral indicators (e.g., frequency of platform access), or environmental attributes (e.g., associated vendor service region). "Attribute response data," as used in this disclosure, is user-supplied or system-inferred response dataset generated by adaptive query interface. "State variables," as used in this disclosure, are quantifiable data points representing measurable system or user conditions whose changes may indicate a shift in workflow relevance, engagement level, or compliance risk. For example and without limitation, state variables may include a user's task completion ratio, time since last interaction, or frequency of vendor updates. "Context-evaluation score," as used in this disclosure, is a computed numerical reflecting degree of change, importance, or urgency associated with variations detected in one or more state variables. In one or more embodiments, at least a processor 102 may employ statistical normalization or weighted-sum evaluation to translate raw attribute changes into a context-evaluation score that captures current engagement or risk profile of workflow. In one or more embodiments, at least a processor 102 may generate a trigger event object 140 as a function of computed context-evaluation score. In one or more embodiments, generating a trigger event object 140 as a function of an action signal 136 may further include classifying, by a machine learning module, received action signal 136 into a plurality of predefined event categories. In one or more embodiments, at least a processor 102 may be configured to compare priority value to at least one propagation threshold. "Propagation threshold," as used in this disclosure, is a defined limit or rule determining whether a trigger event object 140 should be transmitted, logged, or withheld based on its assigned importance. In one or more embodiments, if computed priority value meets or exceeds the propagation threshold, at least a processor 102 may propagate trigger event object 140 to an advisor event stream 160. "Advisor event stream," as used in this disclosure is a continuous data feed or communication channel within advisor view 124 that displays real-time updates, notifications, and privacy-preserving nudges related to user 116 and vendor activities. "Event categories," as used in this disclosure, are predefined classifications that group action signals or trigger event objects based on their semantic meaning, source, or workflow impact. Event categories may include, without limitation, communication events (e.g., message exchange, confirmation receipt), compliance events (e.g., document submission, audit verification), engagement events (e.g., inactivity detection, user re-engagement), and critical escalation events (e.g., missed deadline, vendor failure). In one or more embodiments, event categories may be generated by a machine learning classifier trained to detect patterns or contextual signals within event metadata. "Priority value," as used in this disclosure, is a quantitative or ordinal score assigned to a trigger event object to represent its relative significance, urgency, or risk within a workflow. In one or more embodiments, priority value may be determined as a function of one or more event categories, contextual attribute weights, and recent state-variable changes. In one or more embodiments, priority value may be represented as a scalar numerical level (e.g., 0-1 or 1-10) or as a ranked label (e.g., low, medium, high, critical) that dictates propagation behavior. In one or more embodiments, machine learning module may be used in any of machine learning models, processes, algorithms disclosed in this specification.

With continued reference to FIG. 1, in one or more embodiments, computing device may implement one or more aspects of "generative artificial intelligence (AI)," a type of AI that uses machine learning algorithms to create, establish, or otherwise generate data such as, without limitation, workflow event data, contextual attribute data, and trigger event objects 140 and/or the like in any data structure as described herein (e.g., text, image, video, audio, among others) that is similar to one or more provided training examples. In an embodiment, machine learning module described herein may generate one or more generative machine learning models that are trained on one or more set of assignment data, action signal 136 data, and historical trigger event records. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 1, in some cases, generative machine learning models may include one or more generative models. As described herein, "generative models" refers to statistical models of the joint probability distribution P(X, Y) on a given observable variable x, representing features or data that can be directly measured or observed (e.g., assignment metadata, contextual attribute vectors, or action signal 136 parameters) and target variable y, representing the outcomes or labels that one or more generative models aims to predict or generate (e.g., trigger event priority value, context-evaluation score, or advisor event propagation outcome). In some cases, generative models may rely on Bayes theorem to find joint probability; for instance, and without limitation, Naïve Bayes classifiers may be employed by computing device to categorize input data such as, without limitation, workflow event data, state variable changes, or action signal 136 attributes into different classes such as, without limitation, high-priority trigger events, low-priority trigger events, or deferred advisor notifications.

In a non-limiting example, and still referring to FIG. 1, one or more generative machine learning models may include one or more Naïve Bayes classifiers generated, by computing device, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing Device may then calculate a likelihood table by calculating probabilities of different data entries and classification labels. Computing device may utilize a naïve Bayes equation to calculate a posterior probability for each class. A class containing the highest posterior probability is the outcome of prediction.

Still referring to FIG. 1, although Naïve Bayes classifier may be primarily known as a probabilistic classification algorithm; however, it may also be considered a generative model described herein due to its capability of modeling the joint probability distribution P(X, Y) over observable variables X and target variable Y. In an embodiment, Naïve Bayes classifier may be configured to make an assumption that the features X are conditionally independent given class label Y, allowing generative model to estimate the joint distribution as P(X,Y)=P(Y)ΠiP(Xi|Y), wherein P(Y) may be the prior probability of the class, and $P(X_i|Y)$ is the conditional probability of each feature given the class. One or more generative machine learning models containing Naïve Bayes classifiers may be trained on labeled training data, estimating conditional probabilities $P(X_i|Y)$ and prior probabilities P(Y) for each class; for instance, and without limitation, using techniques such as Maximum Likelihood Estimation (MLE). One or more generative machine learning models containing Naïve Bayes classifiers may select a class label y according to prior distribution P(Y), and for each feature $X_i$, sample at least a value according to conditional distribution $P(X_i|y)$. Sampled feature values may then be combined to form one or more new data instance with selected class label y. In a non-limiting example, one or more generative machine learning models may include one or more Naïve Bayes classifiers to generate new examples of trigger event objects 140 or context-evaluation score distributions based on classified workflow input data such as action signal 136 attributes, state variable transitions, or contextual attribute clusters (e.g., engaged, partially engaged, or disengaged user categories), wherein the models may be trained using training data containing a plurality of features e.g., assignment metadata, temporal engagement frequency, or vendor response latency metrics, and/or the like as input correlated to a plurality of labeled classes e.g., workflow engagement classes or priority categories as output.

Still referring to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 3.

With continued reference to FIG. 1, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 3 to distinguish between different categories e.g., authentic vs. synthetic, or states e.g., TRUE vs. FALSE within the context of generated data such as, without limitations, trigger event object 140, context-evaluation score outputs, or adaptive query response predictions, and/or the like. In some cases, computing device may implement one or more classification algorithms such as, without limitation, Support Vector Machines (SVM), Logistic Regression, Decision Trees, and/or the like to define decision boundaries.

In a non-limiting example, and still referring to FIG. 1, generator of GAN may be responsible for creating synthetic data that resembles real trigger event objects 140 or context-evaluation score outputs. In some cases, GAN may be configured to receive workflow input data such as, without limitation, assignment data, action signals 136, contextual attribute vectors, or state variable histories, as input and generates corresponding trigger event object 140 containing information describing or evaluating the performance of one or more adaptive query interfaces, workflow engagement models, or event propagation mechanisms. On the other hand, discriminator of GAN may evaluate the authenticity of the generated content by comparing it to real trigger event object 140 or advisor event stream 160 records, for example, discriminator may distinguish between genuine and generated content and providing feedback to generator to improve the model performance.

With continued reference to FIG. 1, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and still referring to FIG. 1, VAE may be used by computing device to model complex relationships between workflow input data e.g., assignment data, action signals 136, contextual attribute vectors, and state variable updates. In some cases, VAE may encode input data into a latent space, capturing context-evaluation score distributions, trigger event object 140 patterns, or engagement probability features. Such encoding process may include learning one or more probabilistic mappings from observed workflow input data to a lower-dimensional latent representation. Latent representation may then be decoded back into the original data space, therefore reconstructing the workflow input data. In some cases, such decoding process may allow VAE to generate new examples or variations that are consistent with the learned distributions.

Still referring to FIG. 1, computing device may configure generative machine learning models to analyze input data such as, without limitation, assignment data, action signals 136, contextual attribute vectors, and state variable histories to one or more predefined templates such as validated trigger event object 140 structures or advisor event stream 160 formats representing correct context-evaluation score outputs or workflow propagation outcomes described above, thereby allowing computing device to identify discrepancies or deviations from expected advisor event propagation or workflow state accuracy. In some cases, computing device may be configured to pinpoint specific errors in workflow event sequences, action signal 136 metadata, or contextual attribute mappings or any other aspects of the input data. In a non-limiting example, computing device may be configured to implement generative machine learning models to incorporate additional models to detect anomalous trigger event generation patterns or inconsistent propagation thresholds. In some cases, errors may be classified into different categories or severity levels. In a non-limiting example, some errors may be considered minor, and generative machine learning model such as, without limitation, GAN may be configured to generate corrected trigger event objects 140 or refined context-evaluation score distributions containing only slight adjustments while others may be more significant and demand more substantial corrections. In some embodiments, computing device may be configured to flag or highlight erroneous or inconsistent trigger event objects 140, alerting the advisor user to specific workflow nodes or event chains requiring review, directly on the workflow input data using one or more generative machine learning models described herein. In some cases, one or more generative machine learning models may be configured to generate and output indicators such as, without limitation, visual indicator, audio indicator, and/or any other indicators as described above. Such indicators may be used to signal the detected error described herein.

Still referring to FIG. 1, in some cases, computing device may be configured to identify and rank detected common deficiencies (e.g., misclassified trigger event objects 140, inconsistent context-evaluation scores, or delayed action signal 136 propagation) across plurality of workflow data sources or advisor event streams 160; for instance, and without limitation, one or more machine learning models may classify errors in a specific order e.g., priority-assignment mismatch errors or threshold-propagation failures in a descending order of commonality. Such ranking process may enable a prioritization of most prevalent issues, allowing instructors or computing device to address the underlying workflow deficiency or misclassification bias. In a non-limiting example, if a majority of advisor event streams 160 exhibit recurrent propagation delays following low-priority trigger events, the computing device may detect the pattern and automatically generate corrective propagation rules or retrain the generative model to recalibrate event thresholds, ensuring consistent workflow responsiveness.

Still referring to FIG. 1, in some cases, one or more generative machine learning models may also be applied by computing device to edit, modify, or otherwise manipulate existing data or data structures. In an embodiment, output of training data used to train one or more generative machine learning models such as GAN as described herein may include annotated trigger event examples, reconstructed context-evaluation score maps, or advisor event stream 160 visualizations that linguistically or visually demonstrate modified workflow input data e.g., corrected assignment metadata, normalized action signal 136 timing, or refined contextual attribute distributions, and/or the like. In some cases, generated trigger event object 140 may be synchronized with original workflow input data, for example, and without limitation, in a side-by-side or overlayed arrangement with the input advisor dashboard data, providing real-time visual guidance for workflow correction and prioritization. Additionally, or alternatively, context-evaluation score heatmaps or adaptive feedback prompts may be generated using generative machine learning models to address workflow inefficiencies or engagement deficiencies through predictive visualization. In some cases, such generated trigger event objects 140 or context-evaluation outputs may be integrated with the adaptive query interface, offering user 116 a multisensory instructional experience.

Additionally, or alternatively, and still referring to FIG. 1, computing device may be configured to continuously monitor workflow input data. In an embodiment, computing device may configure discriminator to provide ongoing feedback and further corrections as needed to subsequent input data (e.g., newly received action signals, updated assignment data, or revised contextual attribute entries). In some cases, one or more sensors such as, without limitation, wearable device, motion sensor, or other sensors or devices described herein may provide external engagement metrics or environmental context data that may be used as subsequent input data or training data for one or more generative machine learning models described herein. An iterative feedback loop may be created as computing device continuously receive real-time data, identify errors as a function of real-time data, delivering corrections based on the identified errors, and monitoring advisor response signals, user interaction events, or system performance metrics on the delivered corrections. In an embodiment, computing device may be configured to retrain one or more generative machine learning models based on advisor or user behavioral response data or update training data of one or more generative machine learning models by integrating the captured response signals into the original training data. In such embodiment, iterative feedback loop may allow machine learning module to adapt to the workflow dynamics and evolving engagement profiles, enabling one or more generative machine learning models described herein to learn and update based on observed response patterns and contextual feedback.

With continued reference to FIG. 1, other exemplary embodiments of generative machine learning models may include, without limitation, long short-term memory networks (LSTMs), (generative pre-trained) transformer (GPT) models, mixture density networks (MDN), and/or the like. As an ordinary person skilled in the art, upon reviewing the entirety of this disclosure, will be aware of various generative machine learning models may be used to process sequential workflow input data, predict context-evaluation score trajectories, generate adaptive query prompts, or synthesize trigger event objects 140 as a function of temporal engagement patterns and historical advisor event streams 160.

Still referring to FIG. 1, in a further non-limiting embodiment, machine learning module may be further configured to generate a multi-model neural network that combines various neural network architectures described herein. In a non-limiting example, multi-model neural network may combine LSTM for time-series analysis with GPT models for natural language processing. Such fusion may be applied by computing device to generate context-evaluation score predictions, adaptive query responses, and synthesized trigger event objects 140 correlated with temporal engagement sequences. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others. As an ordinary person skilled in the art, upon reviewing the entirety of this disclosure, will be aware of various generative machine learning models that may be used to generate, refine, or validate trigger event objects 140, prioritize advisor event propagation, and dynamically adjust propagation thresholds based on learned workflow patterns described herein. As an ordinary person skilled in the art, upon reviewing the entirety of this disclosure, will be aware of various multi-model neural network and combination thereof that may be implemented by 100 100 in consistent with this disclosure.

With continued reference to FIG. 1, at least a processor 102 is configured to propagate trigger event object 140 to an advisor event stream 160 within advisor view 124. At least a processor 102 may be configured to exclude trigger event object 140 from user view 128 and vendor view 132. At least a processor 102 may be further configured to generate a sequential series of trigger event objects 140 associated with successive action signal 136, wherein successive action signal 136 is configured into a chronological workflow record. “Advisor event stream,” as used in this disclosure, is a data channel or feed that aggregates, sequences, and displays trigger event objects 140 within an advisor’s interface. In one or more embodiments, advisor event stream 160 may enable advisor to monitor workflow progress, vendor interactions, and client engagement without direct exposure to protected or client-identifiable information. In one or more embodiments, advisor event stream 160 may include a dynamically updating feed configured to present summarized event descriptors such as timestamps, event categories, and anonymized actor identifiers. In one or more embodiments, at least a processor 102 may be configured to apply propagation rules to determine which trigger event objects 140 are eligible for transmission to advisor event stream 160. In one or more embodiments, at least a processor 102 may be configured to exclude trigger event objects 140 from user view 128 and vendor view 132 to preserve privacy boundaries and maintain workflow integrity. In one or more embodiments, exclusion may be implemented by access control layer, which verifies participant role and associated permissions before rendering or transmitting any event data. In one or more embodiments, at least a processor 102 may be configured to generate a sequential series of trigger event objects 140 associated with successive action signals 136, wherein successive action signals 136 are arranged into a chronological workflow record. "Chronological workflow record," as used in this disclosure, is an ordered log representing history of task-related actions, system responses, and generated events across lifecycle of a workflow. In one or more embodiments, chronological workflow record may store trigger event objects 140 in temporal order, enabling reconstruction of event sequences for compliance review, audit verification, or analytic evaluation. In one or more embodiments, advisor event stream 160 may be configured to access or visualize portions of the chronological workflow record through filtering or query interfaces, allowing advisors to trace progression of client and vendor activities over time. "Successive action signal," as used in this disclosure, is a temporally ordered instance of action signal that occurs after a prior event within same workflow context. A successive action signal may represent a follow-up or downstream action derived from, dependent on, or causally linked to one or more preceding action signals. In one or more embodiments, successive action signals may include, without limitation, vendor confirmation following client approval, compliance verification after document submission, or automated reminder issuance following task completion.

With continued reference to FIG. 1, at least a processor 102 is configured to transmit assignment-state data 164 to vendor view 132 as a function of trigger event object 140. "Assignment-state data," as used in this disclosure, is structured information representing status, progress, or outcome of one or more assignments within a workflow. In one or more embodiments, assignment-state data 164 may include indicators of task initiation, acknowledgment, in-progress updates, completion confirmations, or dependency resolutions associated with a specific assignment. In one or more embodiments, assignment-state data 164 may include temporal attributes such as timestamps, progress percentages, or event sequence identifiers that allow the system to reconstruct task evolution over time. In one or more embodiments, assignment-state data 164 may be derived from or updated by trigger event objects 140, action signals 136, or user inputs, and may be propagated selectively to role-specific views, such as advisor or vendor views 132, based on defined access permissions. In one or more embodiments, at least a processor 102 may evaluate trigger event object 140 to identify corresponding vendor task, workflow instance, or service assignment that requires update within vendor view 132. In one or more embodiments, at least a processor 102 may extract relevant non-sensitive state information from trigger event object 140 and format it into assignment-state data 164 suitable for vendor-side display. In one or more embodiments, transmission of assignment-state data 164 may occur through secure communication channels defined by system's access control layer, ensuring that only vendor view 132 associated with specific external resource module receives relevant data. In one or more embodiments, assignment-state data 164 may include confirmation of receipt, completion acknowledgment, or required next-step prompts, enabling vendors to maintain continuity in service delivery and update their own workflow records accordingly. In one or more embodiments, at least a processor 102 may synchronize vendor-facing dashboards or workflow modules in real time as trigger event object 140 is generated. In one or more embodiments, at least a processor 102 may log each transmission event as part of chronological workflow record, enabling traceability of all vendor-facing communications and ensuring that each vendor interaction is accurately documented for audit and compliance purposes.

With continued reference to FIG. 1, at least a processor 102 may be configured to receive user feedback data associated with one or more assignment data 108, update at least one parameter of action signal 136 as a function of user feedback data, and generate an updated action signal 136 as a function of at least one parameter. "User feedback data," as used in this disclosure, is structured or unstructured information provided by a user in response to one or more assignments. In one or more embodiments, user feedback data may represent user's evaluation, confirmation, preference, or experience related to a specific task or workflow process. In one or more embodiments, user feedback data may include qualitative responses (e.g., comments, satisfaction indicators, or textual notes) or quantitative measures (e.g., ratings, completion confirmations, or timing inputs) captured through an adaptive query interface or user view 128 module. In one or more embodiments, user feedback data may serve as a dynamic input allowing system to adjust workflow logic, refine task relevance, or detect engagement trends across users and vendors. "Parameter," as used in this disclosure, is a system attribute within an action signal 136 that determines how signal is processed, categorized, or propagated through workflow. In one or more embodiments, at least one parameter may include priority level, event classification, propagation threshold, timestamp accuracy, or contextual weighting factor. In one or more embodiments, at least a processor 102 may receive user feedback data following completion or partial execution of an assigned task, such as a vendor interaction or service milestone. Upon receipt, at least a processor 102 may analyze user feedback to determine whether it indicates satisfaction, dissatisfaction, or the need for follow-up action. At least a processor 102 may then update one or more parameters of the corresponding action signal 136. In one or more embodiments, generating an updated action signal 136 as a function of user feedback data allows system to maintain a closed feedback loop that dynamically reflects user experience within workflow record.

With continued reference to FIG. 1, at least a processor 102 may be configured to display, by a graphical user interface 168, segmented multi-view workspace 120 including an advisor view 124, a user view 128, and a vendor view 132 as a function of one or more assignment data 108, wherein access to the segmented multi-view workspace is restricted to a corresponding party. In one or more embodiments, graphical user interface 168 may be dynamically generated and contextually rendered to present data and visual elements that correspond to each participant's assigned role, active tasks, and permission scope. In one or more embodiments, graphical user interface 168 may render segmented multi-view workspace 120 as a coordinated yet compartmentalized environment in which each view operates on the same underlying data model but through filtered visual layers. For example and without limitation, within advisor view 124, interface may display aggregated task summaries, trigger event objects 140, and advisor event stream 160 representing current workflow activity across multiple users and vendors. User view 128 may simultaneously present simplified task lists, progress bars, and feedback forms derived from assignment data, enabling users to complete actions and submit confirmations through intuitive interface controls. Vendor view 132 may display service-specific task records, pending requests, or fulfillment checkpoints, allowing vendors to interact directly with assignments relevant to their role. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 168. For example, links to decentralized platforms as described in this disclosure may be incorporated using icons. Using an icon may be a fast way to open documents, run programs etc. because clicking on them yields instant access.

With continued reference to FIG. 1, in an embodiment, graphical user interface 168 and an event handler may operate together to enable seamless interaction between the user and the system 100. Graphical user interface 168 serves as the visual and interactive layer through which the user engages with the system 100, presenting elements such as buttons, sliders, input fields, and informational displays. The event handler, on the other hand, functions as the underlying mechanism that monitors and responds to user interactions with graphical user interface 168. For example, when a user clicks a button on graphical user interface 168 to request an explanation of a concept, the event handler may detect the click event, identify its context, and trigger the appropriate processes within the system 100 to generate a tailored response. This interplay may ensure dynamic and responsive system behavior, as the event handler processes various input events such as clicks, taps, keystrokes, or voice commands, and relays these inputs to the relevant system components. Graphical user interface 168 subsequently updates to reflect the system's responses, such as displaying output, modifying visual elements, or providing real-time feedback. Together, graphical user interface 168 and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface 168. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the system 100 and or the downstream device may include a data structure. As used in this disclosure, "data structure" is a way of organizing data represented in a specialized format on a computer configured such that the information can be effectively presented in a graphical user interface 168. In some cases, the data structure includes any input data. In some cases, the data structure contains data and/or rules used to visualize graphical elements within a graphical user interface 168. In some cases, the data structure may include any data described in this disclosure. In some cases, the data structure may be configured to modify graphical user interface 168, wherein data within the data structure may be represented visually by graphical user interface 168. In some cases, the data structure may be continuously modified and/or updated by at least a processor 102, wherein elements within graphical user interface 168 may be modified as a result. In some cases, at least a processor 102 may be configured to transmit display device and or the downstream device the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. At least a processor 102 may transmit the data described above to a database wherein the data may be accessed from the database. At least a processor 102 may further transmit the data above to a display device, client device, or another computing device. The data structure may serve as the organizational framework that stores, retrieves, and manages data required for processing events and updating graphical user interface 168. The data structure may act as a bridge between the user's input, captured by the event handler, and the output displayed on graphical user interface 168, ensuring that information is handled efficiently and accurately throughout the interaction. For example, without limitation, when a user interacts with a dropdown menu in graphical user interface 168 to select a topic, the event handler May capture this input and accesses a data structure. The data structure may retrieve the relevant information such as, text explanations, videos, or interactive exercises, and passes it back to the event handler, which may then trigger the appropriate updates to graphical user interface 168. In another embodiment, the data structure may also maintain the state of the system, tracking user progress, preferences, and session history. For instance, without limitation, a hash table may store user specific configurations which the event handler references when processing interactions. Graphical user interface 168 may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface 168 (GUI) that allows users to perform actions, provide input, or engage with the system 100. Interactive elements may be designed to facilitate two-way communication between the user and the system, enabling the user to influence the behavior of the apparatus or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the system 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "downstream device" is a device that accesses and interacts with system 100. For instance, and without limitation, downstream device may include a remote device and/or system 100. In a non-limiting embodiment, downstream device may be consistent with a computing device as described in the entirety of this disclosure. Without limitation, the downstream device may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display.

In one or more embodiments, a privacy-preserving "nudge loop" may include a coordinated workflow configured to maintain professional visibility while protecting sensitive client information. In one or more embodiments, workflow may include one or more segmented workspaces accessible by an advisor, a client, and a vendor. Each workspace may include a graphical interface through which advisor may assign one or more tasks to client, and client may engage with vendor and complete assigned tasks. Each client action, such as engaging with the vendor or completing a designated step, may include generation of a nudge event. In one or more embodiments, nudge event may include a minimal data object containing a type, timestamp, and actor identifier and may exclude any protected or personally identifiable information. In one or more embodiments, nudge event may be displayed only within an advisor or professional view and may be used to indicate activity progression without revealing confidential content. In one or more embodiments, nudge loop may include sequencing logic such that each client action triggers subsequent notifications or workflow updates, ensuring that professionals remain aligned in real time. Additional notifications may include updates to other authorized professionals, such as tax or legal advisors, wherein compliance and privacy parameters may be enforced by restricting visibility of the nudge event to the relevant professional class.

Figure 2:
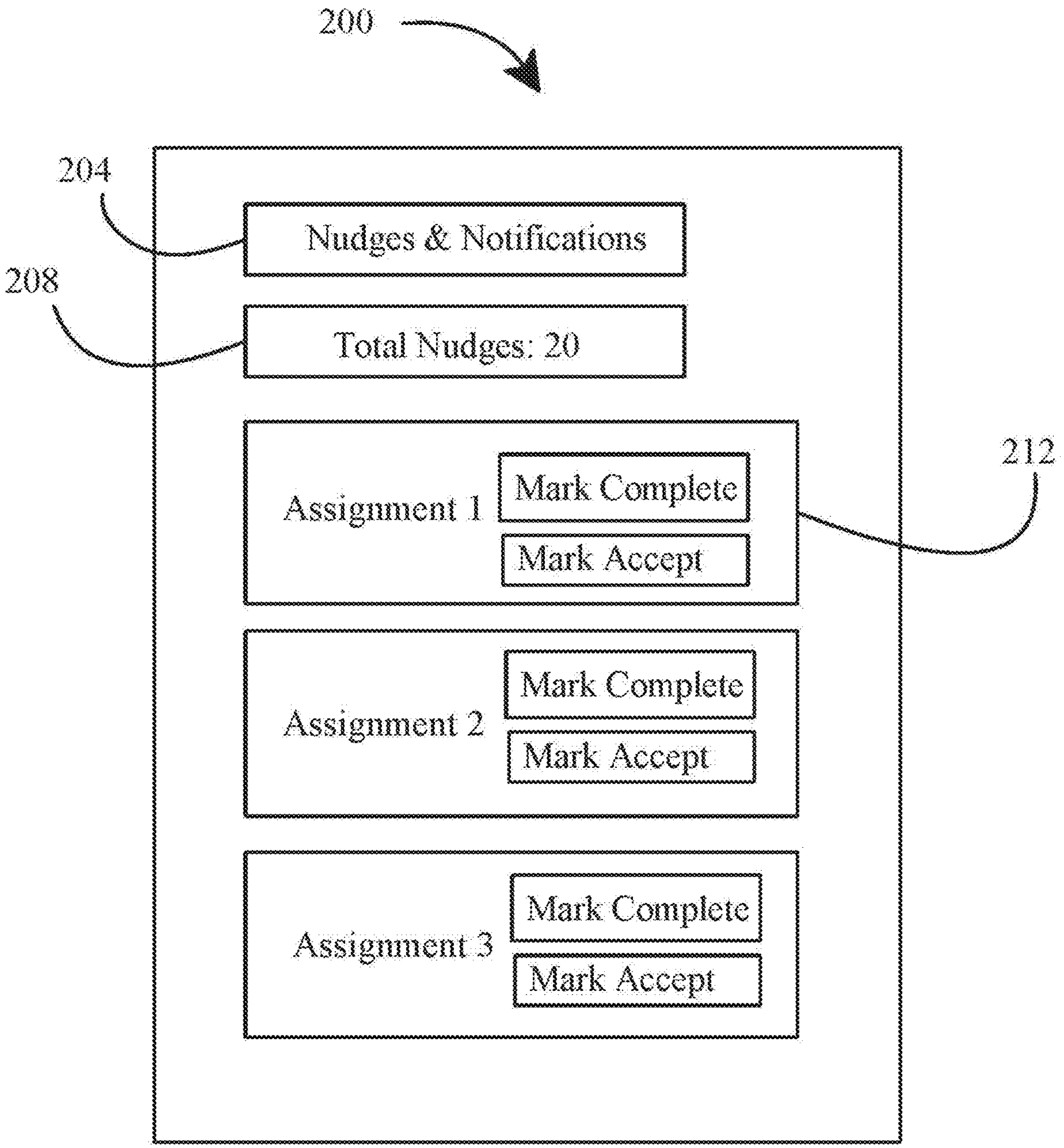
FIG. 2 is an exemplary illustration of a graphical user interface.

Referring now to FIG. 2, an exemplary illustration 200 of a graphical user interface is illustrated. In one or more embodiments, a nudge section 204, a total number of notifications indicator 208, and an assignment panel 212 are shown. In one or more embodiments, graphical user interface 200 may include a nudge section 204 configured to display one or more privacy-preserving nudges generated as a function of trigger event objects propagated to an advisor event stream. Nudge section 204 may include summary elements identifying workflow events that require advisor review, attention, or follow-up action without disclosing client-identifiable information. In one or more embodiments, total number of notifications indicator 208 may include a dynamic counter configured to display the cumulative number of system-generated alerts or nudges associated with active assignments across advisor, user, and vendor views. Total number of notifications indicator 208 may update in real time as trigger event objects are generated, filtered, or resolved, allowing advisors to monitor overall task activity and engagement levels efficiently. In one or more embodiments, assignment panel 212 may include a role-specific interactive interface configured to display task identifiers, action buttons, and assignment details such as "Mark Complete" or "Mark Accept," enabling authorized users to manage workflow progress directly from interface. In one or more embodiments, assignment panel 212 may be synchronized with backend assignment-state data to ensure that changes in task status, vendor updates, or user confirmations are reflected across all connected views.

Figure 3:
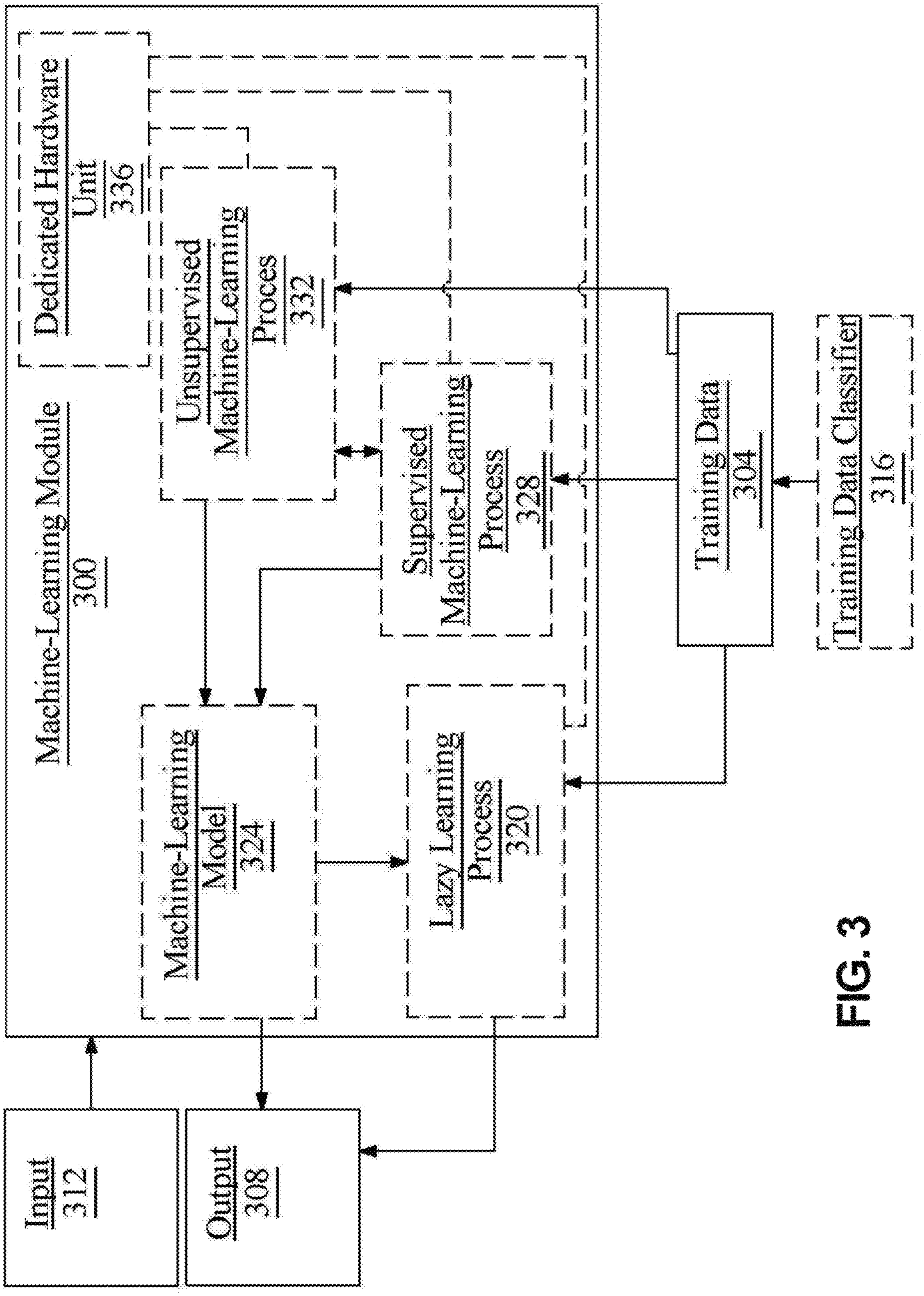
FIG. 3 is a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example input data may include one or more assignment data, action signals, contextual attribute vectors, and user feedback data, while output data may include one or more trigger event objects, context-evaluation scores, and propagation outcomes corresponding to privacy-preserving nudges and advisor event stream updates.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to engagement-related categories such as advisor-focused trigger events, vendor task updates, or user feedback responses Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum $$X_{max}:X_{new} = \frac{X - X_{min}}{X_{max} - X_{min}}.$$

value in the set or subset Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of Scaling may be performed using a median value of a a set or subset of values:

$$X_{new} = \frac{X - X_{mean}}{\sigma}.$$

a set or subset $X_{median}$ and/or interquartile range (IQR), which represents the difference between the $25^{th}$ percentile value and the 50th percentile value (or closest values thereto by a rounding protocol), such as:

$$X_{new} = \frac{X - X_{median}}{IQR}.$$

skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input data as described above as inputs, output data as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
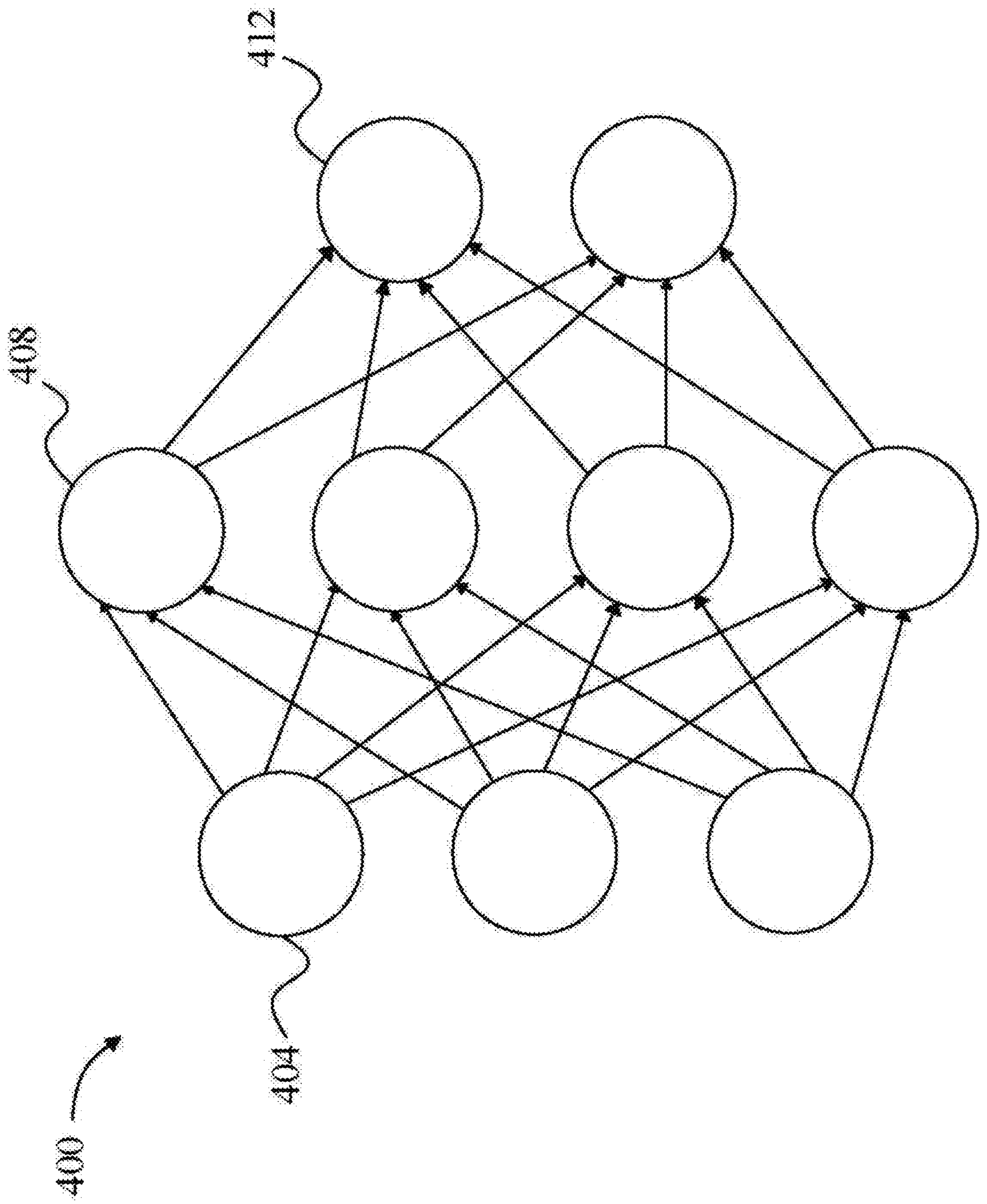
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
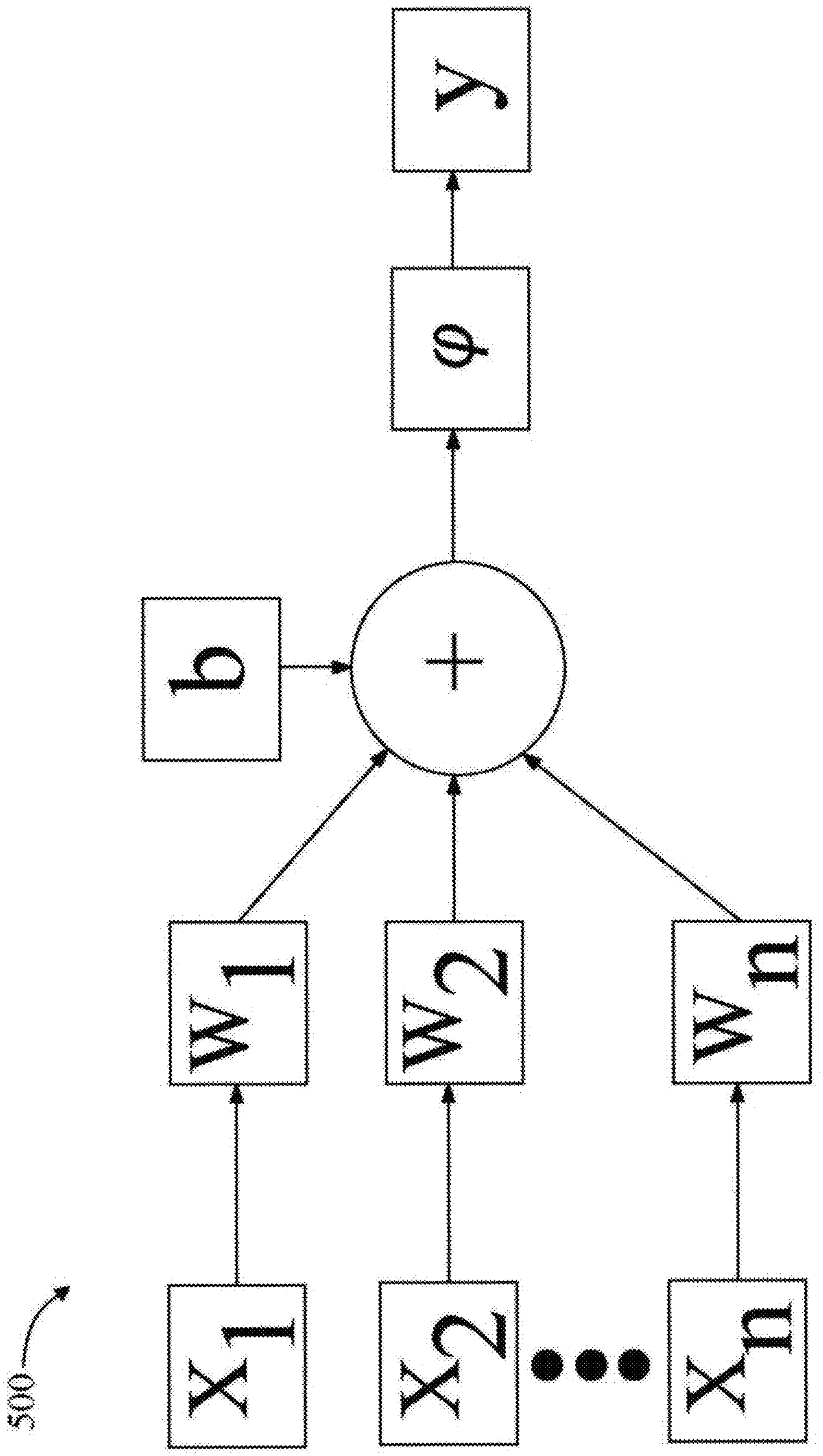
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh(hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda\begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
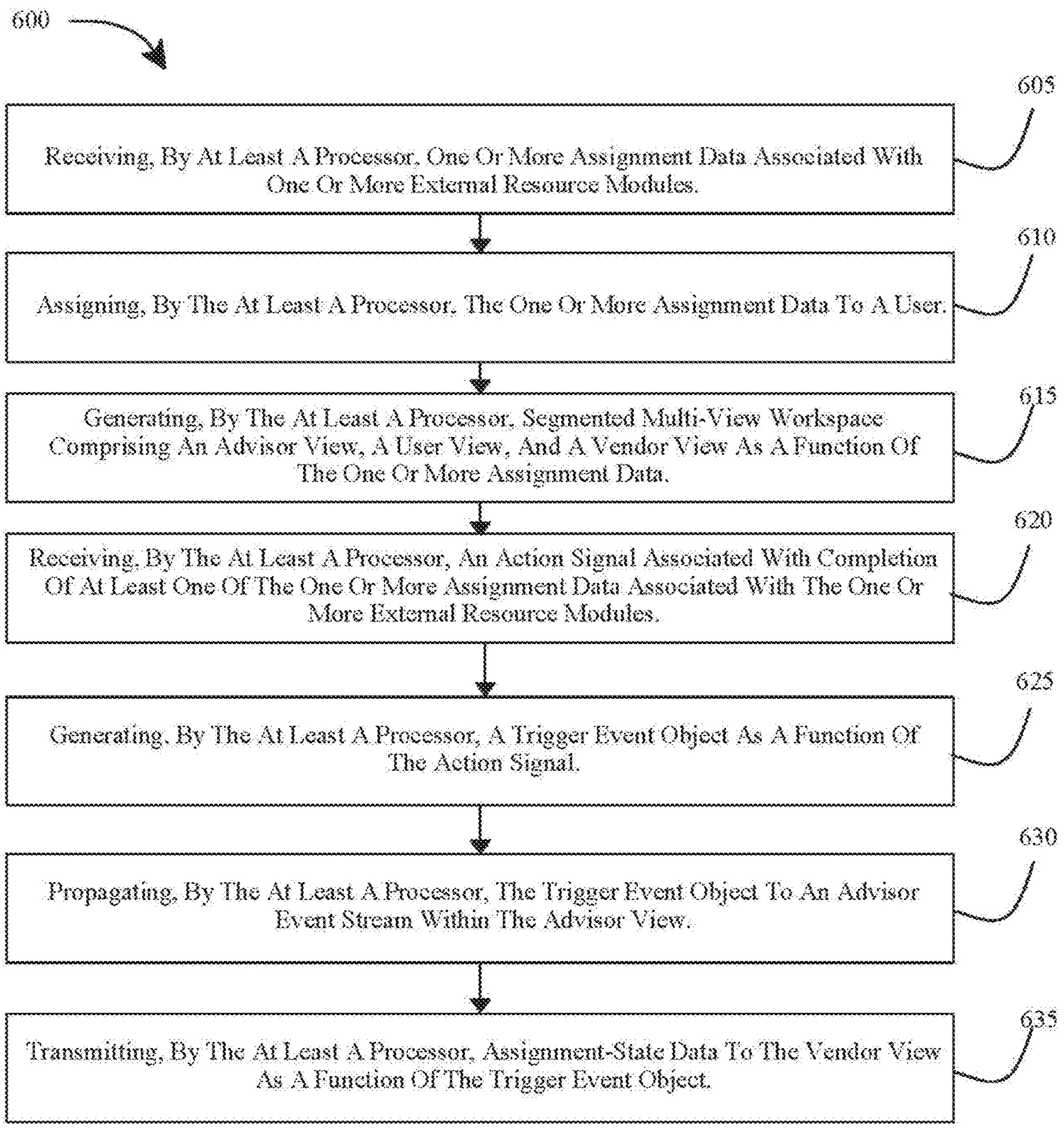
FIG. 6 is a block diagram of an exemplary method of privacy-preserving event handling in distributed data environments.

Referring now to FIG. 6, a flow diagram of an exemplary method 600 for privacy-preserving event handling in distributed data environments is shown. At step 605, method 600 includes receiving, by at least a processor, one or more assignment data associated with one or more external resource modules. This may be implemented as described and with reference to FIGS. 1-5.

With continued reference to FIG. 6, at step 610, method 600 includes assigning, by the at least a processor, the one or more assignment data to a user. This may be implemented as described and with reference to FIGS. 1-5.

With continued reference to FIG. 6, at step 615, method 600 includes generating a segmented multi-view workspace including an advisor view, a user view, and a vendor view as a function of the one or more assignment data. This may be implemented as described and with reference to FIGS. 1-5.

With continued reference to FIG. 6, at step 620, method 600 includes receiving an action signal associated with completion of at least one assignment of the one or more assignment data associated with the one or more external resource modules. This may be implemented as described and with reference to FIGS. 1-5.

With continued reference to FIG. 6, at step 625, method 600 includes generating, by the at least a processor, a trigger event object as a function of the action signal, wherein generating the trigger event object as a function of the action signal comprises: processing, by a privacy-filtering algorithm, privacy-related information within the action signal; redacting the privacy-related information; and replacing the redacted data with anonymized tokens. This may be implemented as described and with reference to FIGS. 1-5.

With continued reference to FIG. 6, at step 630, method 600 includes propagating, by the at least a processor, the trigger event object to an advisor event stream within the advisor view. This may be implemented as described and with reference to FIGS. 1-5.

With continued reference to FIG. 6, at step 635, method 600 includes transmitting, by the at least a processor, assignment-state data to the vendor view as a function of the trigger event object. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
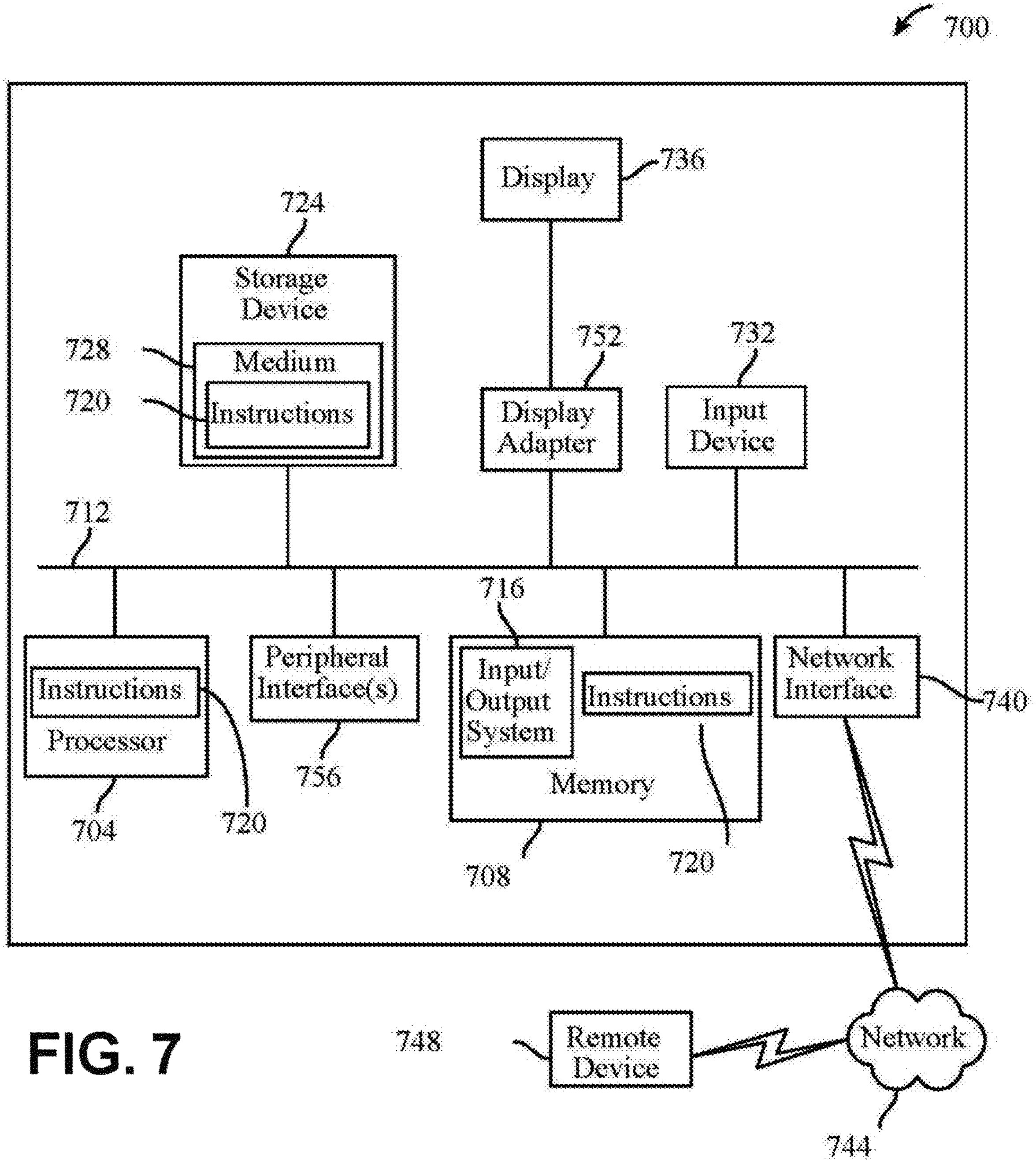
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Figure 8:
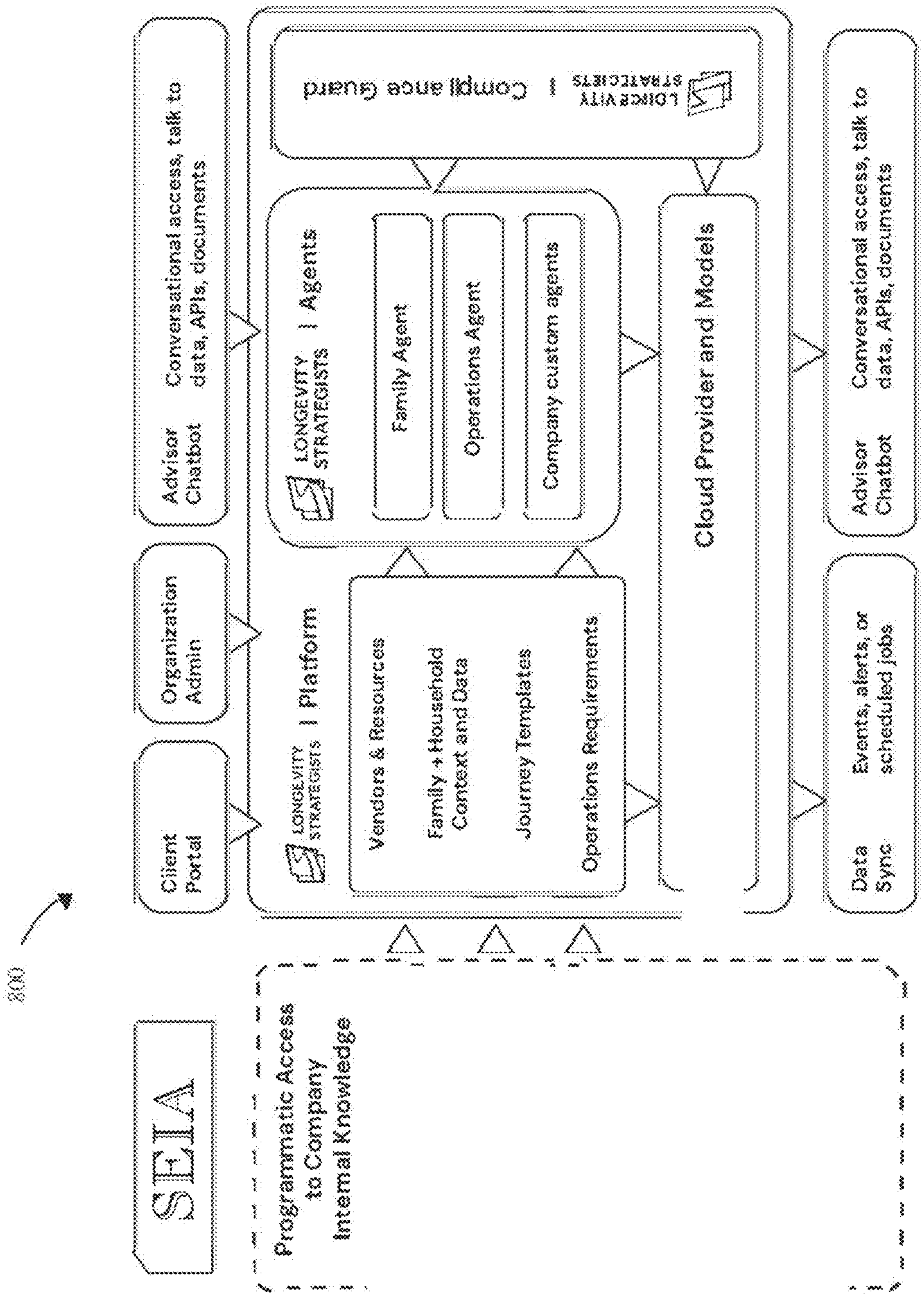
FIG. 8 illustrates a block diagram of a multi-layer artificial intelligence system.

Referring to FIG. 8, an exemplary diagram 800 of a multi-layer artificial intelligence system is illustrated. An exemplary diagram 800 illustrates a high-level architectural view of an enterprise-integrated artificial intelligence platform configured to operate within regulated environments such as financial advisory and professional services. Diagram 800 depicts the manner in which multiple subsystems, including enterprise data sources, a core platform layer, specialized artificial-intelligence agents, cloud-based model execution environments, and a compliance guard, interoperate to provide secure, context-aware, and regulation-aligned AI functionality.

With continued reference to FIG. 8, diagram 800 includes a programmatic access layer disposed on the left side of the figure. In some embodiments, the programmatic access layer may include secure connectors, ingestion pipelines, and authenticated APIs configured to retrieve enterprise data from internal systems such as meeting systems, messaging systems, planning platforms, and account-management tools. As described in the due diligence materials, such data ingestion may occur via SOC-2-aligned interfaces using encryption, access controls, and identity-management mechanisms such as Single Sign-On (SSO). These programmatic interfaces allow the system to access and synchronize structured and unstructured data across corporate applications including meetings, emails, SMS messages, advisor notes, plans, and account information.

With continued reference to FIG. 8, diagram 800 further includes a core platform layer that functions as the chassis upon which downstream agents operate. In some embodiments, the core platform layer may include vendor and resource repositories, a family and household context model, journey templates, and operational and compliance requirements. The family and household context model may represent multi-person household structures, relationships among household members, life-stage attributes, caregiving contexts, and temporal events, enabling AI agents to reason about a system of individuals rather than a single client. Journey templates may define sequenced processes tailored to client needs, such as retirement transitions, caregiving events, or financial-planning workflows. Operational requirements may include firm-specific procedures, regulatory rules, and compliance-guardrails. This platform layer may form the "canvas" upon which all agents perform reasoning tasks, ensuring that AI outputs remain aligned with institutional processes and household-level context.

With continued reference to FIG. 8, diagram 800 also illustrates a multi-agent layer comprising a plurality of specialized agents, such as a family agent, an operations agent, and one or more enterprise-specific custom agents. In some embodiments, the family agent may evaluate family-context data and provide personalized insights relating to household dynamics, care-coordination needs, or vulnerability indicators. The operations agent may evaluate advisor actions or client requests against internal procedures and regulatory constraints. Custom agents may enable firms to encode proprietary reasoning processes or domain-specific expertise. The system may be intentionally designed to support multiple agents operating concurrently over the same contextual dataset, allowing more robust and auditable decision-making than a monolithic model.

With continued reference to FIG. 8, diagram 800 includes a compliance guard subsystem positioned adjacent to the multi-agent layer. In some embodiments, the compliance guard subsystem may enforce role-based access control, validate outbound language-model requests, redact sensitive data, block non-permissible content, and ensure that agents do not violate regulatory constraints or modify enterprise data without explicit authorization. The due diligence questionnaire highlights internal controls such as audit logging, encryption, incident-response policies, third-party risk frameworks, and access-review cycles, all of which may be enforced or integrated into the compliance guard subsystem. This subsystem is architecturally independent from the agents and serves as a non-bypassable security and compliance layer, ensuring technical safeguards rather than policy-level guidance alone.

With continued reference to FIG. 8, diagram 800 further includes a cloud provider and model execution layer, which may utilize infrastructure. In some embodiments, this cloud layer may host large language models, vector search engines, agent orchestration tools, and scheduled compute jobs. The system may rely on cloud-provider services for secure execution of model inference, credential-isolated API access, and scaling of computational workloads. As described in the due diligence documentation, the cloud layer may implement SOC-2-aligned security controls including vulnerability scanning, network segmentation, and multi-factor authentication.

With continued reference to FIG. 8, diagram 800 also includes several user-facing interfaces, such as a client portal, an organization-administration console, and an advisor chatbot. In some embodiments, the advisor chatbot may provide conversational access to enterprise knowledge, household context, and compliant operational workflows. The client portal may present adaptive journeys and context-appropriate information to end users. The organization-administration console may permit enterprise users to manage custom agents, resource libraries, compliance configurations, and operational rules. Role-based permissions, as noted in the due diligence materials, may govern access to each interface to ensure that users interact only with authorized system components.

With continued reference to FIG. 8, the system and methods depicted therein may be integrated into, and operate in coordination with, the functions of system 100 described with respect to FIG. 1 to enhance privacy-preserving control over sensitive textual input. For example, the detection, masking, and visual-indicator logic described with respect to FIG. 8 may be incorporated directly into processor and its associated processing schemes so that the visual state transitions, highlighting events, and GUI-level masking behaviors illustrated in FIG. 8 serve as the user-facing manifestation of an underlying redaction pipeline. As used in this disclosure, a "redaction pipeline" is a sequence of computational operations executed by the processor that detects sensitive textual elements, applies masking or transformation rules to those elements, and generates corresponding visual indicators so that the graphical interface accurately reflects each redaction event in real time. In such embodiments, visual indicator generation described with respect to FIG. 8, event flow management, and interface-update routines may be executed as part of the same cascading sequence used to detect processing elements, thereby enabling real-time rendering of highlights, mask placeholders, or warning icons whenever a processing scheme identifies a sensitive segment within textual input.

With continued reference to FIG. 8, the system may further be used to implement the display-level behaviors, including locking and unlocking the text input field, suspending keystroke processing, synchronizing unmasked and masked views, and presenting interactive visual cues corresponding to applied data masks. As used in this disclosure, "display-level behaviors" are interface-level actions performed by a graphical user interface to visually represent, control, or update how textual input is shown to a user during processing or masking operations. As used in this disclosure, "locking and unlocking the text input field" is a process in which the system temporarily disables or re-enables user editing within a text field to prevent or allow further input while sensitive-data processing is occurring. As used in this disclosure, "suspending keystroke processing" is a temporary halt in interpreting or transmitting user keystrokes so that no new characters are accepted or sent for processing until a masking or verification event is completed. As used in this disclosure, "synchronizing unmasked and masked views" is a coordinated update mechanism in which the system maintains parallel representations of the same text, one fully visible and one redacted, so that changes in one representation are accurately reflected in the other. As used in this disclosure, "presenting interactive visual cues corresponding to applied data masks" is the act of displaying icons, highlights, tooltips, or other graphical indicators that notify the user when specific segments of text have been masked and allow user interaction with those indicators. For example, when processor detects a processing element and applies a data mask, interface logic is described with respect to FIG. 8 may immediately annotate the corresponding region using color-coding, hover tooltips, or categorical icons to signal the masking event. Similarly, GUI-driven confirmation workflow described with respect to FIG. 8 may be employed as the mechanism through which processed textual input is displayed for user verification prior to routing to external system. In this manner, the operational processes of FIG. 1, particularly identification, masking, classification, and completion of cascading sequence, may be complemented by detailed user-interface mechanisms described with respect to FIG. 8, ensuring that every internal privacy-filtering action is transparently communicated to the user through consistent, real-time visual indicators.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for privacy-preserving event handling in distributed data environments, wherein the system comprises:
- a memory; and
- at least a processor communicatively connected to the memory, wherein the memory contains instructions configuring the at least a processor to:
  - receive one or more assignment data associated with one or more external resource modules;
  - assign the one or more assignment data to a user;
  - generate a segmented multi-view workspace comprising an advisor view, a user view, and a vendor view as a function of the one or more assignment data;
  - receive an action signal associated with completion of at least one assignment of the one or more assignment data associated with the one or more external resource modules;
  - generate a trigger event object as a function of the action signal, wherein generating the trigger event object as a function of the action signal comprises:
    - processing, by a privacy-filtering algorithm, privacy-related information within the action signal;
    - redacting the privacy-related information; and
    - replacing the redacted data with anonymized tokens;
  - transform the action signal into a role-scoped event representation that is independent from the action signal and excludes the privacy-related information while preserving a referential linkage to the one or more assignment data;
  - propagate the trigger event object to an advisor event stream within the advisor view, wherein the trigger event object is selectively propagated to the advisor event stream and is excluded from at least one of the user view and the vendor view as a function of a role-based access control associated with the segmented multi-view workspace; and
  - transmit assignment-state data to the vendor view as a function of the trigger event object.

2. The system of claim 1, wherein the trigger event object comprises metadata, wherein the metadata comprises at least one of an event type, a timestamp, and a source identifier.

3. The system of claim 1, wherein the at least a processor is further configured to generate a sequential series of trigger event objects associated with a successive action signal, wherein the successive action signal is configured into a chronological workflow record.

4. The system of claim 1, wherein the segmented multi-view workspace further comprises an access control layer, wherein the access control layer is configured to separate permissions for the vendor view, the user view and the advisor view.

5. The system of claim 1, wherein the at least a processor is further configured to:
- generate an adaptive query interface, wherein the adaptive query interface is configured to collect contextual attribute data from the user;
- receive attribute response data comprising one or more state variables from the user;
- compute a context-evaluation score as a function of changes detected in the one or more state variables; and
- generate the trigger event object as a function of the context-evaluation score.

6. The system of claim 1, wherein generating the trigger event object as a function of the action signal further comprises:
- classifying, by a machine learning model, the action signal into a plurality of predefined event categories; and
- assigning a priority value to the trigger event object as a function of the plurality of predefined event categories.

7. The system of claim 6, wherein the at least a processor is further configured to:
- compare the priority value to at least one propagation threshold; and
- propagate the trigger event object to an advisor event stream within the advisor view as a function of the priority value and the propagation threshold.

8. The system of claim 1, wherein the at least a processor is further configured to:
- receive user feedback data associated with the one or more assignment data;
- update at least one parameter of the action signal as a function of the user feedback data; and
- generate an updated action signal as a function of the updated at least one parameter.

9. The system of claim 1, wherein the at least a processor is further configured to display, by a graphical user interface, the segmented multi-view workspace comprising the advisor view, the user view, and the vendor view as a function of the one or more assignment data, wherein access to the segmented multi-view workspace is restricted to a corresponding party.

10. A method of privacy-preserving event handling in distributed data environments, the method comprises:

receiving, by at least a processor, one or more assignment data associated with one or more external resource modules;

assigning, by the at least a processor, the one or more assignment data to a user;

generating, by the at least a processor, a segmented multi-view workspace comprising an advisor view, a user view, and a vendor view as a function of the one or more assignment data;

receiving, by the at least a processor, an action signal associated with completion of at least one assignment of the one or more assignment data associated with the one or more external resource modules;

generating, by the at least a processor, a trigger event object as a function of the action signal, wherein generating the trigger event object as a function of the action signal comprises:

processing, by a privacy-filtering algorithm, privacy-related information within the action signal;

redacting the privacy-related information; and replacing the redacted data with anonymized tokens;

transforming, using the at least a processor, the action signal into a role-scoped event representation that is independent from the action signal and excludes the privacy-related information while preserving a referential linkage to the one or more assignment data;

propagating, by the at least a processor, the trigger event object to an advisor event stream within the advisor view, wherein the trigger event object is selectively propagated to the advisor event stream and is excluded from at least one of the user view and the vendor view as a function of a role-based access control associated with the segmented multi-view workspace; and transmitting, by the at least a processor, assignment-state data to the vendor view as a function of the trigger event object.

11. The method of claim 10, wherein the trigger event object comprises metadata, wherein the metadata comprises at least one of an event type, a timestamp, and a source identifier.

12. The method of claim 10, further comprising generating a sequential series of trigger event objects associated with a successive action signal, wherein the successive action signal is configured into a chronological workflow record.

13. The method of claim 10, wherein the segmented multi-view workspace further comprises an access control layer, wherein the access control layer is configured to separate permissions for the vendor view, the user view and the advisor view.

14. The method of claim 10, further comprising:

generating, by the at least a processor, an adaptive query interface, wherein the adaptive query interface is configured to collect contextual attribute data from the user;

receiving, by the at least a processor, attribute response data comprising one or more state variables from the user;

computing, by the at least a processor, a context-evaluation score as a function of changes detected in the one or more state variables; and generating, by the at least a processor, the trigger event object as a function of the context-evaluation score.

15. The method of claim 10, wherein generating the trigger event object as a function of the action signal further comprises:

classifying, by a machine learning model, the action signal into a plurality of predefined event categories; and assigning a priority value to the trigger event object as a function of the plurality of predefined event categories.

16. The method of claim 15, further comprising:

comparing, by the at least a processor, the priority value to at least one propagation threshold; and propagating, by the at least a processor, the trigger event object to an advisor event stream within the advisor view as a function of the priority value and the propagation threshold.

17. The method of claim 10, further comprising:

receiving, by the at least a processor, user feedback data associated with the one or more assignment data;

updating, by the at least a processor, at least one parameter of the action signal as a function of the user feedback data; and generating, by the at least a processor, an updated action signal as a function of the updated at least one parameter.

18. The method of claim 10, further comprising displaying, by a graphical user interface, the segmented multi-view workspace comprising the advisor view, the user view, and the vendor view as a function of the one or more assignment data, wherein access to the segmented multi-view workspace is restricted to a corresponding party.

* * * * *